United States Patent
Chen et al.

(10) Patent No.: US 7,731,220 B2
(45) Date of Patent: Jun. 8, 2010

(54) FRAME ASSEMBLY FOR DOUBLE-SEAT BABY STROLLER

(75) Inventors: Shun-Min Chen, Taipei (TW); Ru Yi Li, Taipei (TW); Fu Xian Yu, Taipei (TW)

(73) Assignee: Wonderland NurseryGoods Co., Ltd., Taipei (TW)

( * ) Notice: Subject to any disclaimer, the term of this patent is extended or adjusted under 35 U.S.C. 154(b) by 404 days.

(21) Appl. No.: 11/826,787

(22) Filed: Jul. 18, 2007

(65) Prior Publication Data

US 2008/0143082 A1    Jun. 19, 2008

(30) Foreign Application Priority Data

Dec. 19, 2006  (CN) .......................... 2006 1 0171175
Jan. 22, 2007   (CN) ..................... 2007 2 0001403 U

(51) Int. Cl.
B62B 7/06          (2006.01)

(52) U.S. Cl. ........................ 280/639; 280/642; 280/650; 280/657

(58) Field of Classification Search .............. 280/47.35, 280/47.39, 47.4, 638, 639, 642, 643, 647, 280/649, 650, 657
See application file for complete search history.

(56) References Cited

U.S. PATENT DOCUMENTS

| | | | |
|---|---|---|---|
| 2,601,379 A * | 6/1952 | Everest et al. ............. | 280/47.39 |
| 2,632,654 A * | 3/1953 | Cornish ........................ | 280/42 |
| 2,639,162 A * | 5/1953 | Schon ......................... | 280/42 |
| 2,989,318 A   | 6/1961 | L. Schenkman | |
| 3,736,021 A * | 5/1973 | MacLaren .................... | 297/42 |
| 4,116,465 A * | 9/1978 | Maclaren .................... | 280/647 |
| 4,232,897 A * | 11/1980 | Maclaren et al. .............. | 297/45 |
| 4,245,849 A * | 1/1981 | Thiboutot .................... | 280/20 |
| 4,266,807 A * | 5/1981 | Griffin ........................ | 280/650 |
| D262,696 S *  | 1/1982 | Perego ....................... | D12/129 |
| 4,618,184 A * | 10/1986 | Harvey ........................ | 297/19 |
| D288,913 S *  | 3/1987 | Hawkes ..................... | D12/129 |
| 4,753,453 A * | 6/1988 | Schilbach ................... | 280/643 |

(Continued)

FOREIGN PATENT DOCUMENTS

EP          1733948 A2 * 12/2006

(Continued)

*Primary Examiner*—Hau V. Phan
*Assistant Examiner*—Brodie Follman
(74) *Attorney, Agent, or Firm*—Bacon & Thomas, PLLC

(57) ABSTRACT

A frame assembly for a double-seat baby stroller is provided. The frame assembly comprises: a first frame including a first main post, plural first bars, plural second bars, plural third bar, a central post and a first folding device pivotally connected to one another; and a second frame including a second main post, plural fourth bars, plural fifth bars, plural sixth bar, the central post and a second folding device pivotally connected to one another. The frame assembly is characterized by further comprising a linking mechanism connecting one of the bars of the first frame and one of the bars of the second frame, wherein when the second main post of the second frame and the central post become close to each other, the one of the bars of the first frame is driven to move via the linking mechanism by the one of the bars of the second frame, so that the first main post of the first frame and the central post become close to each other.

20 Claims, 17 Drawing Sheets

U.S. PATENT DOCUMENTS

| | | | | |
|---|---|---|---|---|
| 4,765,645 | A * | 8/1988 | Shamie | 280/644 |
| 4,886,289 | A * | 12/1989 | Yee et al. | 280/643 |
| 4,986,564 | A * | 1/1991 | Liu | 280/642 |
| 5,076,390 | A * | 12/1991 | Haskins | 280/250.1 |
| 5,181,735 | A * | 1/1993 | Onishi | 280/642 |
| 5,221,106 | A * | 6/1993 | Shamie | 280/644 |
| 5,288,098 | A * | 2/1994 | Shamie | 280/642 |
| 5,333,893 | A | 8/1994 | Chen | |
| 5,348,336 | A * | 9/1994 | Fernie et al. | 280/641 |
| 5,496,050 | A * | 3/1996 | Geiger et al. | 280/250.1 |
| 5,622,376 | A * | 4/1997 | Shamie | 280/642 |
| 5,769,448 | A | 6/1998 | Wang | |
| 5,845,925 | A * | 12/1998 | Huang | 280/642 |
| 5,857,688 | A * | 1/1999 | Swearingen | 280/250.1 |
| 6,135,475 | A * | 10/2000 | Brown et al. | 280/250.1 |
| 6,363,550 | B1 * | 4/2002 | Wang | 5/99.1 |
| 6,428,034 | B1 * | 8/2002 | Bost | 280/650 |
| 6,431,579 | B1 | 8/2002 | Kaneko et al. | |
| 6,527,294 | B1 * | 3/2003 | Brewington et al. | 280/647 |
| 6,572,133 | B1 * | 6/2003 | Stevens | 280/642 |
| 6,725,475 | B1 * | 4/2004 | Chen | 5/98.1 |
| 6,729,791 | B1 * | 5/2004 | Chen | 403/102 |
| 6,752,405 | B1 * | 6/2004 | Wright | 280/47.38 |
| 6,811,178 | B2 * | 11/2004 | Tomasi et al. | 280/650 |
| 6,830,254 | B2 * | 12/2004 | Lan | 280/47.4 |
| 6,843,499 | B2 * | 1/2005 | Guo | 280/642 |
| 6,860,504 | B2 * | 3/2005 | Suga et al. | 280/642 |
| 6,877,762 | B2 * | 4/2005 | Yamazaki | 280/647 |
| 6,915,545 | B2 * | 7/2005 | Chen | 16/297 |
| 7,021,650 | B2 * | 4/2006 | Chen | 280/642 |
| 7,108,275 | B2 * | 9/2006 | Yeh et al. | 280/647 |
| 7,178,822 | B2 * | 2/2007 | Chen | 280/642 |
| 7,380,311 | B2 * | 6/2008 | Chen | 16/326 |
| 7,434,827 | B2 * | 10/2008 | Yeh et al. | 280/642 |
| 7,516,966 | B2 * | 4/2009 | Gray | 280/47.38 |
| D598,333 | S * | 8/2009 | Li et al. | D12/129 |
| 2002/0033588 | A1 * | 3/2002 | Kaneko et al. | 280/650 |
| 2003/0229968 | A1 * | 12/2003 | Chen | 16/297 |
| 2004/0071499 | A1 * | 4/2004 | Chen | 403/102 |
| 2004/0150174 | A1 * | 8/2004 | Lan | 280/47.4 |
| 2005/0212264 | A1 * | 9/2005 | Yeh et al. | 280/647 |
| 2005/0242547 | A1 * | 11/2005 | Chen | 280/642 |
| 2006/0088368 | A1 * | 4/2006 | Chen | 403/52 |
| 2006/0131841 | A1 * | 6/2006 | Huang | 280/647 |
| 2006/0197313 | A1 * | 9/2006 | Yeh et al. | 280/642 |
| 2006/0255567 | A1 * | 11/2006 | Dotsey et al. | 280/649 |
| 2006/0261576 | A1 * | 11/2006 | Dotsey et al. | 280/649 |
| 2007/0013169 | A1 * | 1/2007 | Dotsey et al. | 280/642 |
| 2009/0014986 | A1 * | 1/2009 | Chen et al. | 280/658 |
| 2009/0026733 | A1 * | 1/2009 | Gray | 280/643 |
| 2009/0102163 | A1 * | 4/2009 | Ohnishi | 280/649 |
| 2009/0134604 | A1 * | 5/2009 | Ohnishi | 280/649 |
| 2009/0243260 | A1 * | 10/2009 | Longenecker et al. | 280/642 |

FOREIGN PATENT DOCUMENTS

| | | | |
|---|---|---|---|
| EP | 1762457 A2 * | 3/2007 | |
| FR | 2567472 A1 * | 1/1986 | |
| GB | 2178379 A | 2/1987 | |
| GB | 2278633 A * | 12/1994 | |
| GB | 2303416 A | 2/1997 | |
| GB | 2393489 A * | 3/2004 | |
| GB | 2404691 A * | 2/2005 | |
| JP | 02234876 A * | 9/1990 | |

* cited by examiner

FRAME ASSEMBLY FOR DOUBLE-SEAT BABY STROLLER

BACKGROUND OF THE INVENTION

1. Field of the Invention

The present invention relates to a frame assembly for a baby stroller, and in particular to a frame assembly for a double-seat baby stroller.

2. Description of related arts

In prior arts, when folding a double-seat stroller, users cannot fold the entire frame of the stroller with one hand.

For example, U.S. Pat. No. 6,431,579 discloses a twin-type baby buggy. When the baby buggy is to be folded, operation members 21 provided on left and right handle pipes 15a, 15c must be manipulated to unlatch lock members 20 of the left and right frames, so that the front legs and the rear legs are close to each other to reduce size in the fore and aft direction, and then pulled the right and left frames to become close to each other to reduce the width from the left to the right.

SUMMARY OF THE INVENTION

Accordingly, it is an object of the present invention to provide a frame structure for a double-seat bay stroller that overcomes the problem with the aforementioned prior art.

In accordance with one aspect of the present invention, a frame assembly for a double-seat baby stroller is provided. The frame assembly comprises: a first frame including a first main post, plural first bars, plural second bars, plural third bar, a central post and a first folding device pivotally connected to one another; and second frame including a second main post, plural fourth bars, plural fifth bars, plural sixth bar, the central post and a second folding device pivotally connected to one another; wherein the frame assembly further comprises a linking mechanism connecting one of the bars of the first frame and one of the bars of the second frame, and when the second main post of the second frame and the central post become close to each other, the one of the bars of the first frame is driven to move via the linking mechanism by the one of the bars of the second frame, so that the first main post of the first frame and the central post become close to each other.

Preferably, the linking mechanism further comprises a linking member vertically movably connected to the central post, one end of the one of the bars of the first frame and one end of the one of the bars of the second frame being pivotally connected to the linking member respectively.

Preferably, the linking member has a pair of vertical slide ways arranged in a column and a pair of horizontal slide ways at two sides of the pair of vertical slide ways, and the one of the bars of the first frame and the one of the bars of the second frame are pivotally connected at the lower vertical slide way and slidably connected at the pair of horizontal slide ways respectively.

Preferably, the linking mechanism further comprises a guide member fixed to the central post, the guide member having a pair of slide ways opposed to each other at two sides to be connected with the one of the bars of the first frame and the one of the bars of the second frame respectively.

Preferably, the pair of slide ways of the guide member are in the form of an arc.

Preferably, the guide member includes a front housing portion and a rear housing portion, each of the front and rear portions having the pair of slide ways opposed to each other in the left and right portions, one end of the one of the bars of the first frame being located between the linking member and the rear housing portion, one end of the one of the bars of the second frame being located between the rear housing portion and the central post.

Preferably, the linking mechanism includes a linking bar, one end of the linking bar being connected to the one of the bars of the first frame and the other end of the linking bar being connected to the one of the bars of the second frame.

Preferably, the one end of the linking bar is connected to one of the third bar of the first frame, and the other end of the linking bar is connected to one of the fourth bars of the second frame.

In accordance with another aspect of the present invention, a frame assembly for a double-seat baby stroller is provided. The frame assembly includes a first main post; a second post; a central post provided between the first and second main posts; a first frame including plural bars provided between the first post and the central post, the plural bars being pivotally connected to the first post and the central post; a second frame including plural bars provided between the second post and the central post, the plural bars being pivotally connected to the second post and the central post; and a linking mechanism connecting one of the bars of the first frame and one of the bars of the second frame so as to drive the first post, the central post and the second post to become close to one another simultaneously so that the frame assembly is in a folded state, and to become away from one another simultaneously so that the frame assembly is in an extended state.

Preferably, the frame assembly comprises a folding device provided between the first main post and the central, post and movable between a locked position and an unlocked position, wherein when the folding device is in the locked position, the frame assembly remains in the extended state, and when the folding device is in the unlocked position, the first main post and the central post are able to become close to each other, and the second main post and the central post are simultaneously driven to become close to each other by the linking mechanism so that the frame assembly is in the folded state.

Preferably, the linking mechanism comprises a linking member vertically movably connected to the central post, the one of the bars of the first frame and the one of the bars of the second frame being pivotally connected to the linking member respectively.

Preferably, the linking member has a pair of vertical slide ways arranged in a column and a pair of horizontal slide ways at two sides of the pair of vertical slide ways, and the one of the bars of the first frame and the one of the bars of the second frame are pivotally connected at the lower vertical slide way and slidably connected at the pair of horizontal slide ways respectively.

Preferably, the linking mechanism comprises a linking bar, one end of the linking bar being connected to one of the bars of the first frame and the other end of the linking bar being connected to one of the bars of the second frame.

Preferably, the linking mechanism further comprises a link base slidably mounted on the central post and a pair of linking bars, one end of the linking bars being pivotably connected to two sides of the linking base, the other end of the linking bars being pivotally connected respectively to the one of the bars of the first frame and the one of the bars of the second frame.

In accordance with a further aspect of the present invention, a frame assembly for a double-seat baby stroller is provided. The frame assembly comprises: a first frame including a first main post, plural first bars, plural second bars, plural third bar, a central post and a first folding device pivotally connected to one another; a second frame including a second main post, plural fourth bars, plural fifth bars, plural sixth bar, the central post and a second folding device pivotally connected to one another; and a linking mechanism slidably mounted on the central post; wherein one of the bars of the first frame and one of the bars of the second frame are pivotally connected to two sides of the linking mechanism respectively, and the linking mechanism is able to drive upward and downward along the central post so as to drive the first post, the central post and the second main post to become close to or away from one another simultaneously.

Preferably, the linking mechanism further comprises a linking base slidably mounted on the central post and a pair of linking bars, one end of the linking bars being pivotally connected to two sides of the linking base respectively, the other end of the linking bars being pivotally connected to the one of the bars of the first frame and the one of the bars of the second frame respectively.

Preferably, the linking mechanism includes a folding unit connecting the linking base and movable between a locked position and an unlocked position, wherein when the folding unit is in the locked position, the linking base is fixed to the central post, and when the folding unit is in the unlocked position, the folding unit is able to drive the linking base to move with respect to the central post.

Preferably, the folding unit includes a retaining bracket fixed to the central post and an actuating post fixed to the linking base and moved slidably relative to the retaining bracket, the actuating post being movable between a locked position where the actuating post is locked with the retaining bracket and the first post, and the central post and the second main post are moved to become away from each other; and an unlocked position where the actuating post is able to slide relative to the retaining bracket and the first post, and the central post and the second main post are moved to become close to each other simultaneously.

Preferably, the linking mechanism further includes an elastic member received within the actuating post and having plural protrusions protruding out of the actuating post, and the retaining bracket includes a through hole provided with plural recesses, so that the actuating post are rotatable between a locked position where the protrusions of the elastic member are received in the recesses of the through hole and an unlocked position where the protrusions of the elastic member are removed from the recesses.

Preferably, the linking mechanism comprises a linking member vertically movably connected to the central post and having a pair of horizontal slide ways at two sides, so that one end of the one of the bars of the first frame and one end of the one of the bars of the second frame are slidably connected to the pair of horizontal slide ways respectively.

Further and other objects and characteristics of the present invention will be made clear by preferred embodiments described below referring to accompanying drawings.

BRIEF DESCRIPTION OF THE DRAWINGS

These and other features, aspects and advantages of the present invention will become more apparent from the following description, appended claims, and accompanying exemplary embodiments shown in the drawings, which are briefly described below.

DETAIL DESCRIPTION OF THE PREFERRED EMBODIMENT

First Preferred Embodiment

Structure of the Frame Assembly

A frame assembly for a double-seat baby stroller according to a first preferred embodiment of the present invention will be described below with reference to FIGS. 1 to 7.

Figure 1:
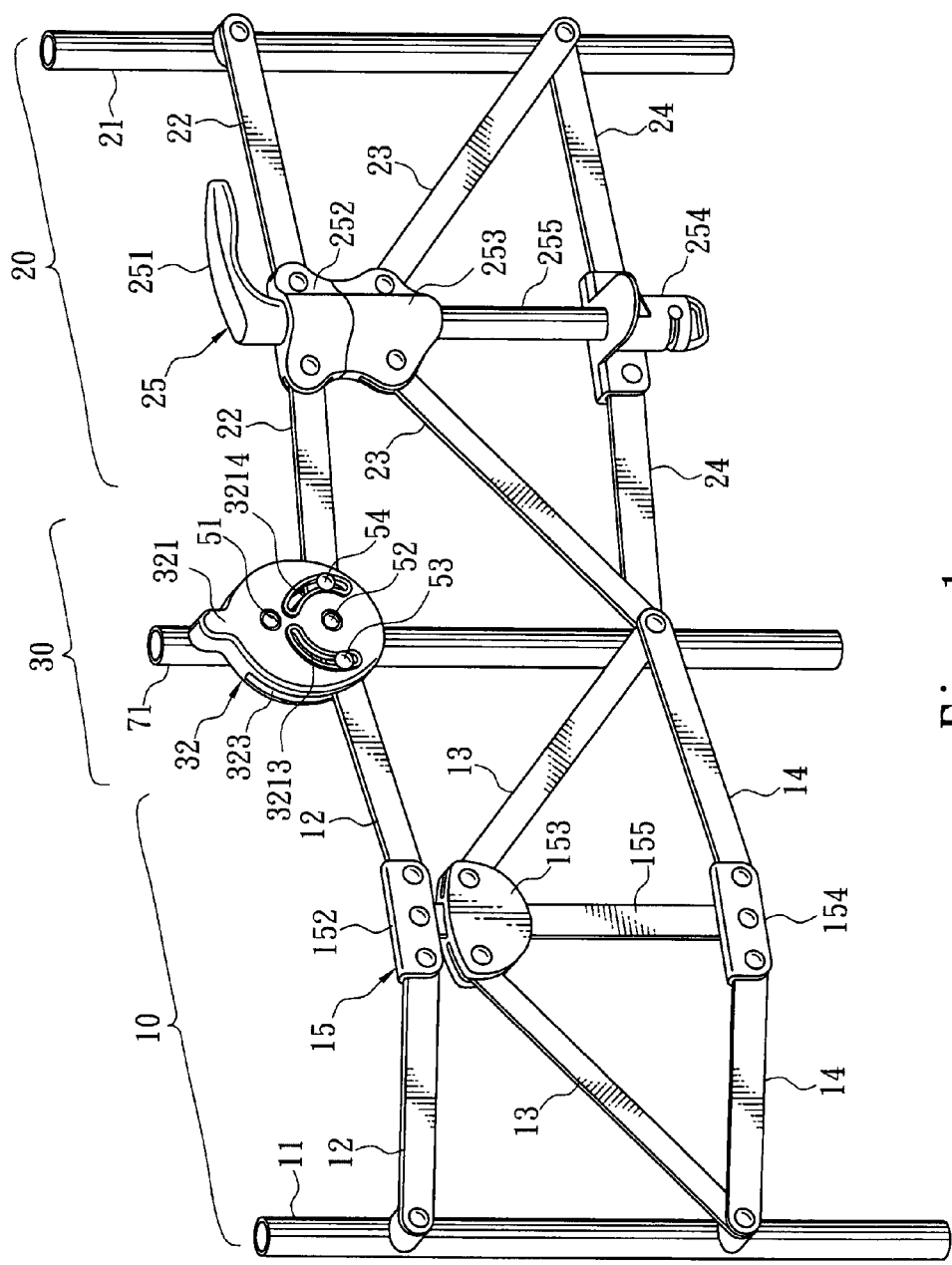
FIG. 1 is a perspective view of a frame assembly for a double-seat baby stroller according to a first preferred embodiment of the present invention.

As shown in FIG. 1, the frame assembly comprises a first frame 10, a second frame 20 and a linking mechanism 30.

The first frame 10 includes a first main post 11, two first bars 12, two second bars 13, two third bars 14, a central post 71 and a first folding device 15.

The first folding device 15 includes an upper pivot joint 152, a slide 153, a lower pivot joint 154 and a guide bar 155. The guide bar 155 is passed through a perforation (not shown) of the slide 153 so that the slide 153 can slide on the guide bar 155. An upper end of the guide bar 155 is fixed to the center of the upper pivot joint 152, and a lower end of the guide bar 155 is fixed to the center of the lower pivot joint 154.

Figure 2:
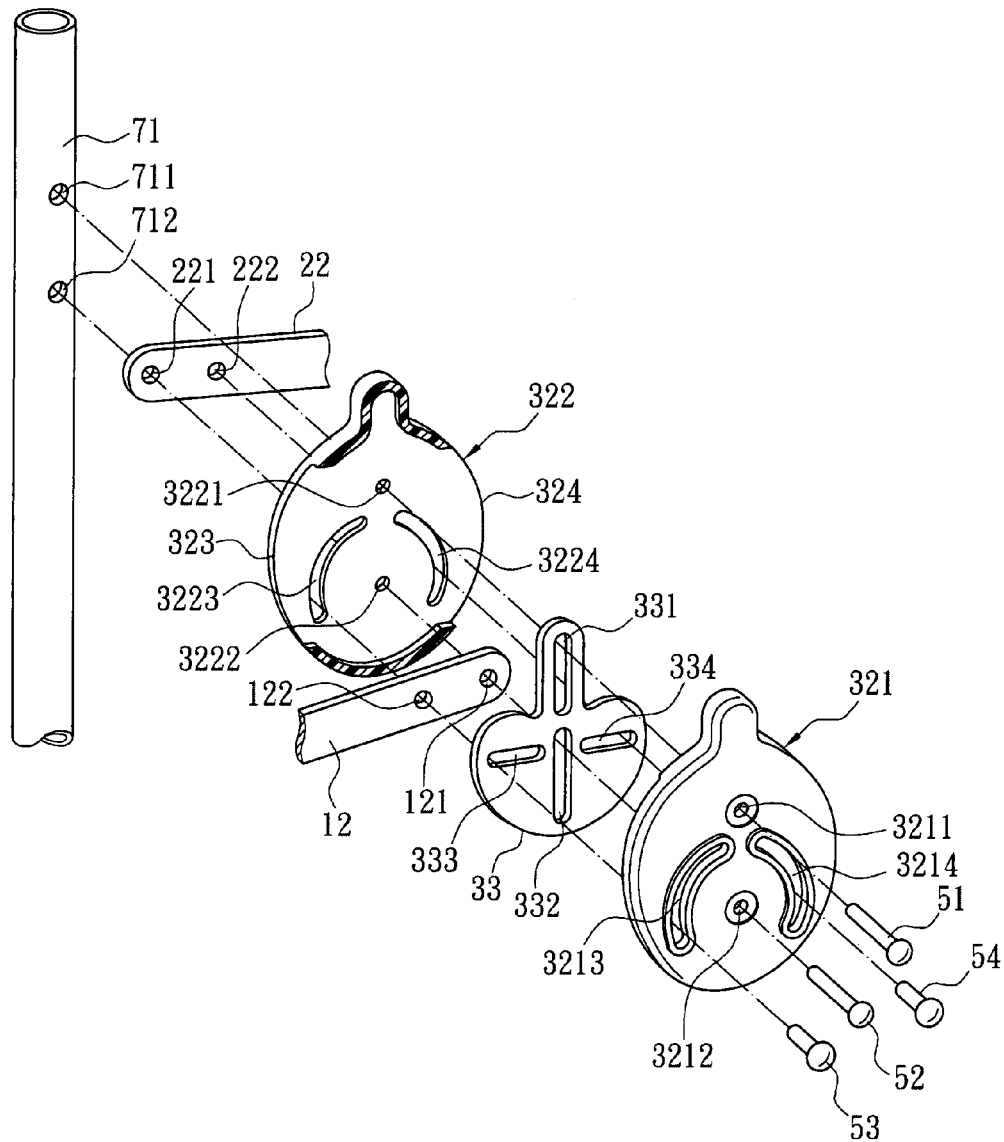
FIG. 2 is an exploded view showing a linking mechanism of the frame assembly of FIG. 1.

The respective ends of the two first bars 12 close to each other are pivotally connected to the left and right sides of the upper pivot joint 152 respectively. The left end of the first bar 12 on the left is pivotally connected to the first main post 11, and the right end of the first bar 12 on the right is provided with a first pivot hole 121 and a second pivot hole 122, as shown in FIG. 2. The respective ends of the two second bars 13 close to each other are pivotally connected to the left and right sides of the slide 153 respectively. The respective ends of the two third bars 14 close to each other are pivotally connected to the left and right sides of the lower pivot joint 154. The left end of the left second bar 13 and the left end of the left third bar 14 are pivotally connected together to the first main post 11.

The second frame 20 includes a second main post 21, two fourth bars 22, two fifth bars 23, two sixth bars 24, the central post 71 and a lock-type folding device 25.

The lock-type folding device 25 includes a handle 251, a base 252, a slide 253, a pedal 254 and a guide bar 255. The lock-type folding device 25 can be one of other conventional locking device as long as it enables the base 252 and the slide 253 to be interlocked in position. The handle 251 is an actuator for release of the interlocking, but not limited to the handle of the present embodiment. The guide bar 255 is passed through a perforation (not shown) of the slide 253 so that the slide 253 can slide on the guide bar 255. An upper end of the guide bar 255 is fixed to the center of the base 252, and a lower end of the guide bar 255 is fixed to the center of the pedal 254.

The respective ends of the two fourth bars 22 close to each other are pivotally connected to the left and right sides of the base 252 respectively. The right end of the fourth bar 22 on the right is pivotally connected to the second main post 21, and the left end of the fourth bar 22 on the left is provided with a third pivot hole 221 and a fourth pivot hole 222, as shown in FIG. 2. The respective ends of the two fifth bars 23 close to each other are pivotally connected to the left and right sides of the slide 253 respectively. The respective ends of the two sixth bars 24 close to each other are pivotally connected to the left and right sides of the pedal 254. The right end of the right fifth bar 23 and the right end of the sixth bar 24 are pivotally connected together to the second main post 21.

As shown in FIGS. 1 and 2, the linking mechanism 30 includes a housing 32 and a linking plate 33. Since the linking plate 33 is contained in the housing 32, the linking plate 33 is not shown in FIG. 1.

As shown in FIG. 2, the housing 32 is a flat, elliptic hollow housing in this embodiment, and includes a front housing portion 321, a rear housing portion 322, and a first side opening 323 and a second side opening 324 opposed to each other in left and right portions.

On the front housing portion 321 are formed a first pin hole 3211 and a second pin hole 3212 below the first pin hole 3211 and a first slide way 3213 and a second slide way 3214 at two sides of the first and the second pin holes 3211, 3212. The first slide way 3213 and the second slide way 3214 are in the form of an arc. The first slide way 3213 and the second slide way 3214 extend outward with respect to the longitudinal direction. The upper ends of the first slide way 3213 and the second slide way 3214 are close to each other, and the lower ends of the first slide way 3213 and the second slide way 3214 become away from each other.

In the same structure as the front housing portion 321, on the rear housing portion 322 are formed a third pin hole 3221, a fourth pin hole 3222, a third slide way 3223 and a fourth slide way 3224 corresponding to the first pin hole 3211, second pin hole 3212, first slide way 3213 and second slide way 3214 of the front housing portion 321, respectively. The third slide way 3223 and the fourth slide way 3224 are in the form of an arc.

On the linking plate 33 are formed a first vertical slide way 331 and a second vertical slide way 332 below the first vertical slide way 331 and a first horizontal slide way 333 and a second horizontal slide way 334 opposed to each other in left and right portions respectively.

Assembly of the Linking Mechanism

The connection of the linking mechanism 30 with the first frame 10 and the second frame 20 will be described below with reference to FIGS. 1 and 2.

First, the linking plate 33 is received within the housing 32.

Next, as shown in FIG. 2, a first connecting pin 51 (for example, a rivet) is passed through the first pin hole 3211 of the front housing portion 321 of the housing 32, the first vertical slide way 331 of the linking plate 33 and the third pin hole 3221 of the rear housing portion 322 of the housing 32 in turn, and is further fixed to a first fixing hole 711 of the central post 71.

Further, as shown in FIG. 2, the right end of the right first bar 12 is inserted into the first side opening 323 to be positioned between the linking plated 33 and the rear housing portion 322, the left end of the left fourth bar 22 is positioned between the housing 32 and the central post 71, and a second connecting pin 52 (for example, a rivet) is passed through the second pin hole 3212 of the front housing portion 321, the second vertical slide way 332 of the linking plate 33, the first pivot hole 121 of the right first bar 12, the fourth pin hole 3222 of the rear housing portion 322 and the third pivot hole 221 of the left fourth bar 22 in turn, and is further fixed to a second fixing hole 712 of the central post 71.

Furthermore, as shown in FIG. 2, a third connecting pin 53 (for example, a rivet) is passed through the first slide way 3213 of the front housing portion 321, the first horizontal slide way 333 of the linking plate 33, the second pivot hole 122 of the right first bar 12 and the third slide way 3223 of the rear housing portion 322 in turn.

In addition, as shown in FIG. 2, a fourth connecting pin 54 (for example, a rivet) is passed through the second slide way 3214 of the front housing portion 321, the second horizontal slide way 334 of the linking plate 33, the fourth slide way 3224 of the rear housing portion 322 and the second pivot hole 222 of the left fourth bar 22 in turn.

In the present embodiment, since the housing 32 is adapted to facilitate moving smoothly between the bars, the housing 32 can be omitted or only one of the front housing portion 321 and the rear housing portion 322 is used.

Finally, as shown in FIG. 1, the right end of the right second bar 13, the right end of the right third bar 14, the left end of the left fifth bar 23 and the left end of the left sixth bar 24 are pivotally connected together to the central post 71.

By means of the above configuration, the frame assembly for a double-seat baby stroller according to the first preferred embodiment of the present invention is achieved.

Folding Operation of the Frame Assembly

The concept of embodiment for the present invention is that when one side frame unit (the second frame 20) is operated to fold, the other side frame unit (the first frame 10) is brought to fold with the one side frame unit simultaneously. This concept applies to the extending operation of the frame assembly as well.

Figure 3:
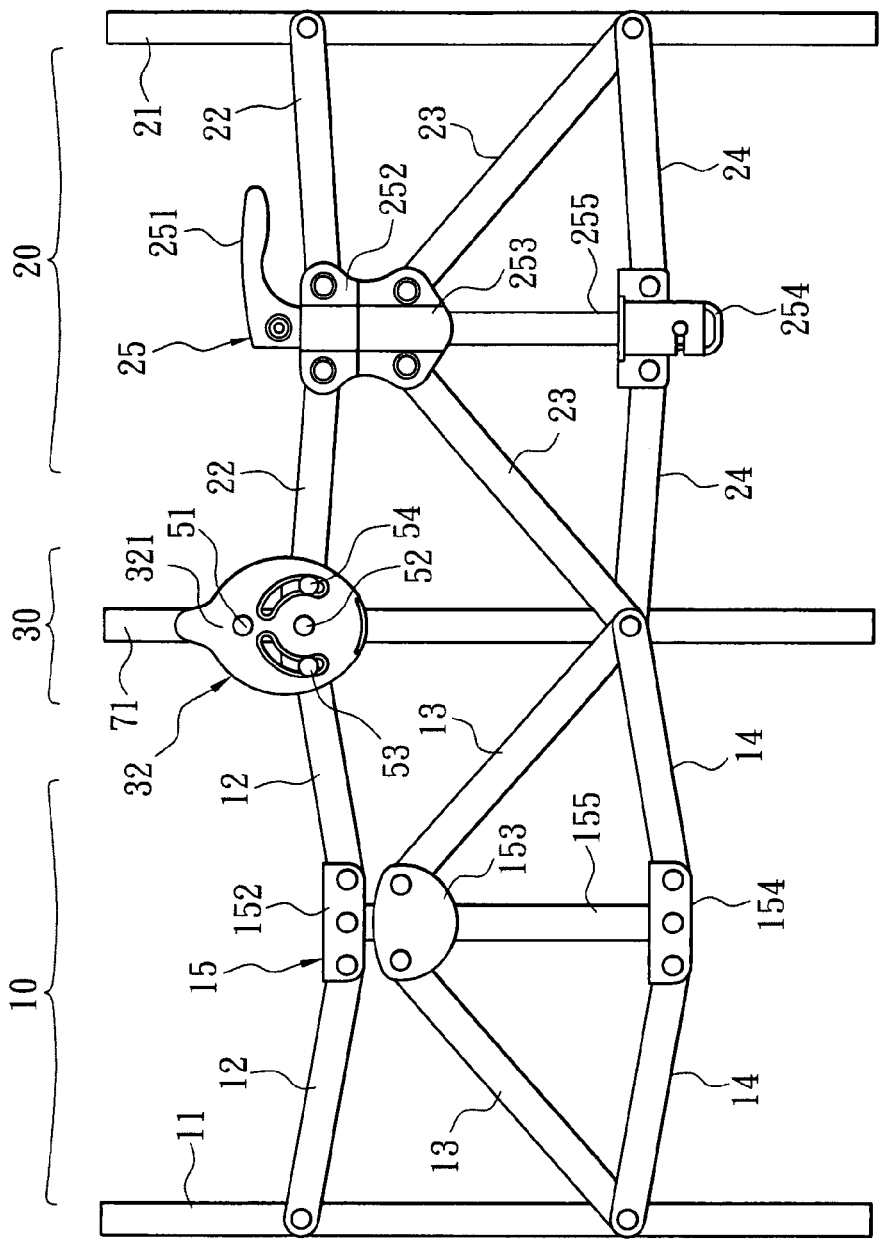
FIG. 3 is a front view showing the frame assembly of FIG. 1 in an extended state.
Figure 5:
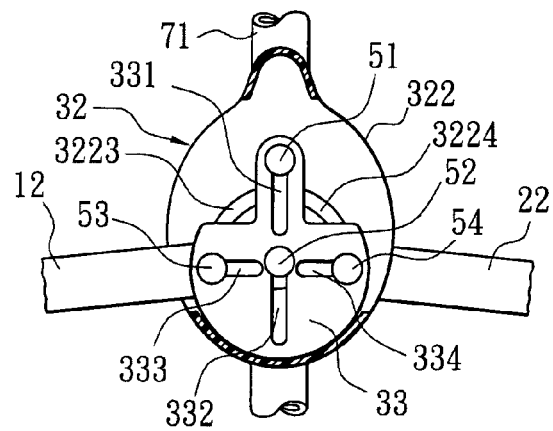
FIG. 5 is a cutaway view showing the linking mechanism of FIG. 2 in an extended state.
Figure 6:
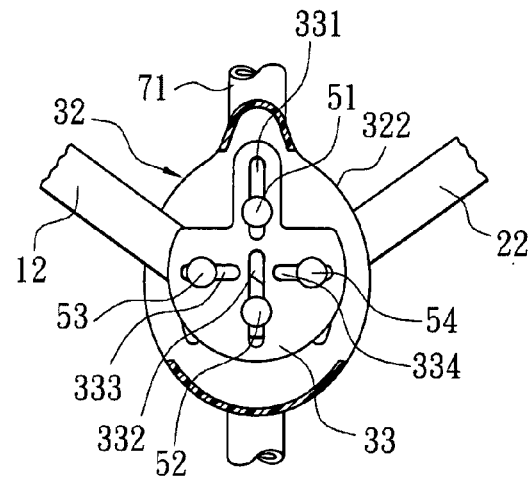
FIG. 6 is a cutaway view showing the linking mechanism of FIG. 2 in a semi-folded state.
Figure 7:
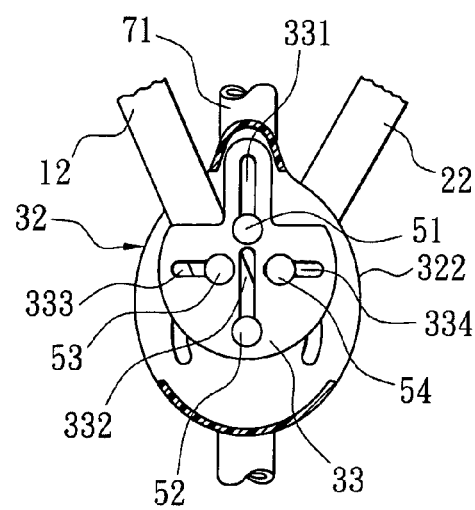
FIG. 7 is a cutaway view showing the linking mechanism of FIG. 2 in a folded state.

When the frame assembly is to be folded (at this time, FIG. 3 shows the frame assembly in an extended state), the handle 251 is rotated to unlock the lock-type folding device 25 so that the base 252 and the slide 253 are unlocked therebetween. Then, the guide bar 255 is turned and pulled upward and the pedal 254 is moved upward with the handle 251 and the guide bar 255, so that the bars 22, 23 and 24 of the second frame 20 are pivotally folded. As shown in FIGS. 5 to 7, the first frame 10 is moved to fold by the linking mechanism 30 connected between the first frame 10 and the second frame 20. Following the left fourth bar 22 is pivoted upward with respect to the second connecting pin 52, the fourth connecting pin 54 moves along the second horizontal slide way 334 so that the linking plate 33 moves relative to the housing 32 or the central pole 71. In the meantime, the third connecting pin 53 on the first frame 10 is driven to move along the first horizontal slide way 333, so that the first main post 11, the central post 71 and the second main post 21 become close to one another to complete the folding operation of the frame assembly.

Extending Operation of the Frame Assembly

Figure 4:
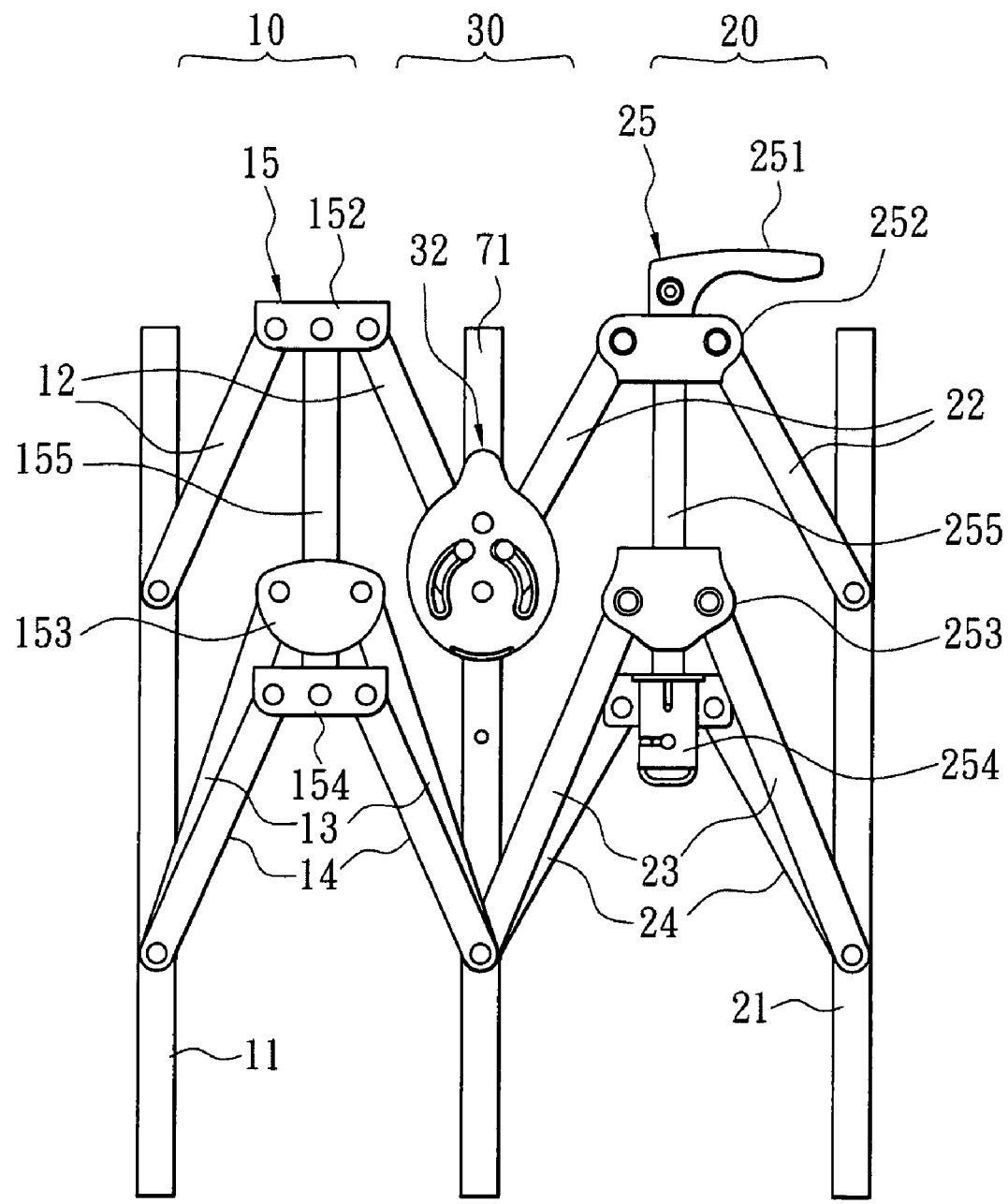
FIG. 4 is a front view showing the frame assembly of FIG. 1 in a folded state.

When the frame assembly is to be extended (at this time, FIG. 4 shows the frame assembly in a folded state), the user can hold the central post 71 with his hand and steps on the pedal 254 to drive the bars 22, 23 and 24 of the second frame 20 to pivot. The bars 12, 13 and 14 of the first frame 10 are pivoted simultaneously by the linking mechanism 30, so that the first main post 11, the central post 71 and the second main post 21 become away from one another, and the slide 253 moves upward along the guide bar 255 and is finally locked with the base 252 to hold the frame assembly in the extended state.

Second Preferred Embodiment

Structure of the Frame Assembly

Figure 8:
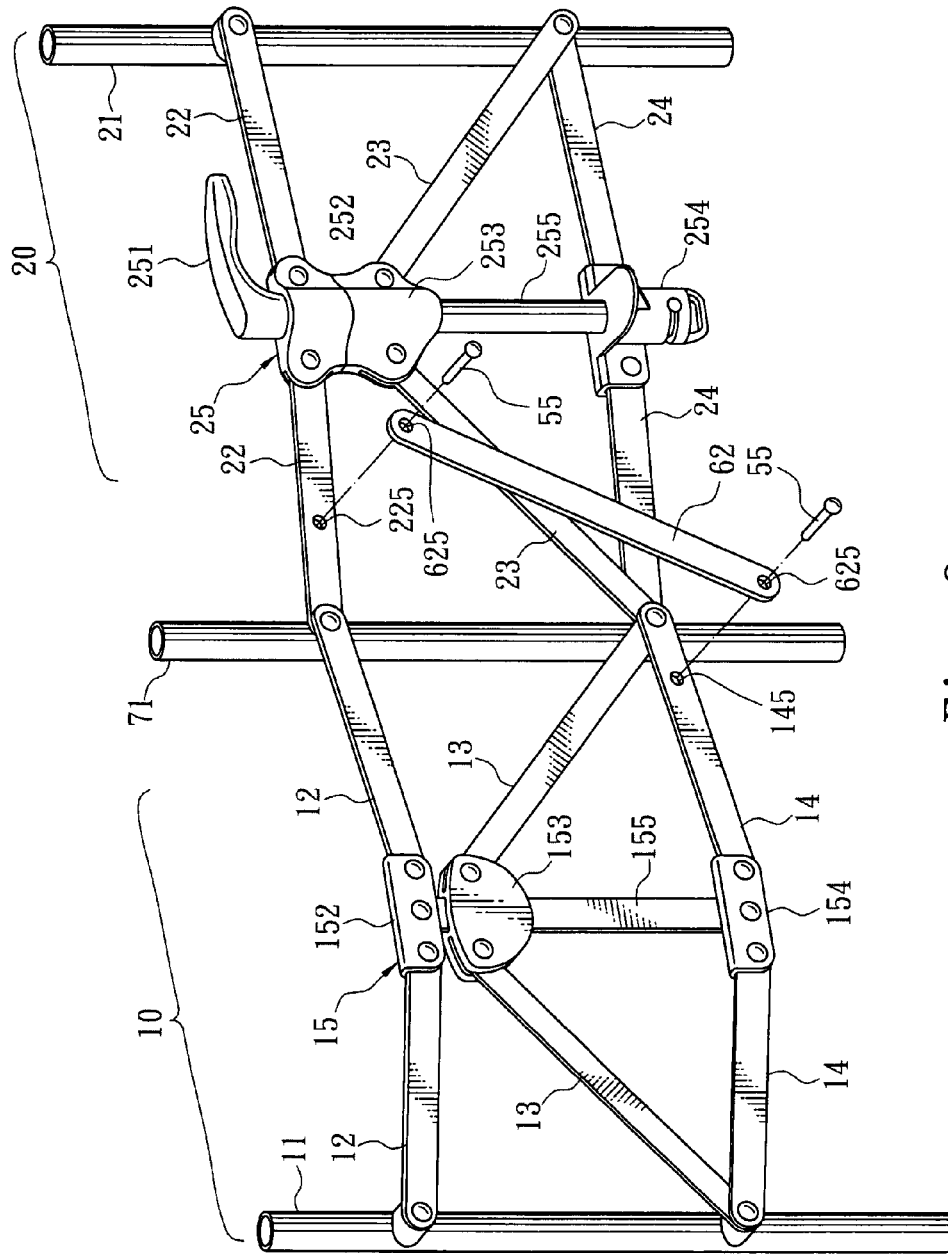
FIG. 8 is a perspective view of a frame assembly for a double-seat baby stroller according to a second preferred embodiment of the present invention with a linking bar being detached from the frame assembly.

As shown in FIG. 8, a frame assembly for a double-seat baby stroller according to a second preferred embodiment of the present invention includes a first frame 10, a second frame 2 and a linking mechanism.

The first frame 10 and second frame 20 of the second embodiment are substantially the same as those of the first embodiment, and thus the description thereof is omitted. The differences between both embodiments are that the right third bar 14 of the second embodiment is formed thereon with a pivot hole 145, and the left fourth bar 22 thereof is formed thereon with a pivot hole 225.

The linking mechanism of the present embodiment is a linking bar 62 having a pivot hole 625 at each of both ends thereof.

Assembly of the Linking Mechanism

As shown in FIG. 8, the right end of the right first bar 12 and the left end of the left fourth bar 22 are pivotally connected together to the central post 71, and the right end of the right second bar 13, the right end of the right third bar 14, the left end of the left fifth bar 23 and the left end of the left sixth bar 24 are pivotally connected together to the central post 71. Then, two connecting pins are passed through the two pivot holes 625 of the linking bar 62 and pivotally connected to the pivot hole 145 of the right third bar 14 and the pivot hole 225 of the left fourth bar 22 respectively.

In the present embodiment, the linking bar 62 can also be pivotally connected to the right first bar 12 and the left sixth bar 24 or to the right first bar 12 and the left fifth bar 23 as long as it is pivotally connected to the respective bars of the different frames. That is to say, if the linking bar 62 is pivotally connected to the fourth bar 22 and the third bar 14, then one of these two bars is driven to pull the other one to achieve the folding operation of the frame assembly, and if the linking bar 62 is pivotally connected to the first bar 12 and the sixth bar 24, then one of these two bars is driven to push the other one upward to achieve the folding operation of the frame assembly.

By means of the above configuration, the frame assembly for a double-seat baby stroller according to the second preferred embodiment of the present invention is achieved.

Folding Operation of the Frame Assembly

Figure 9:
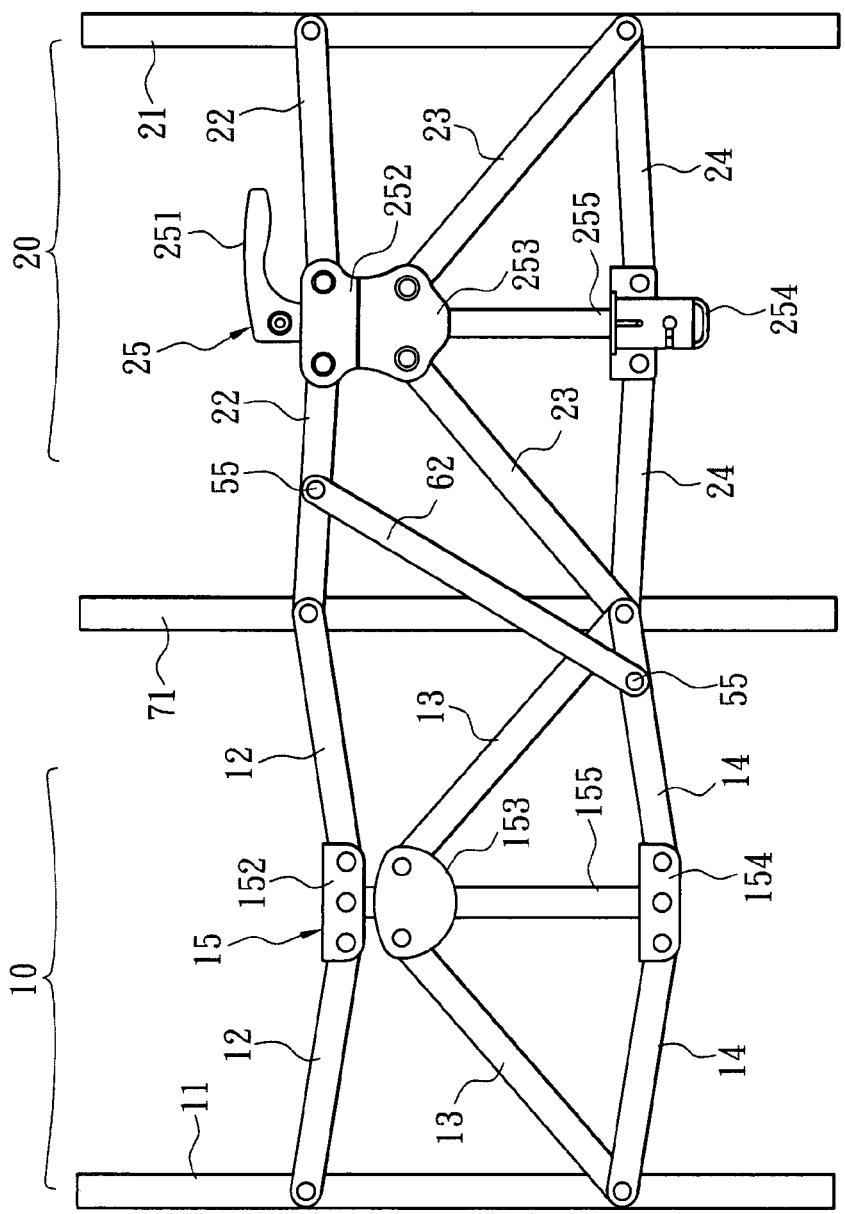
FIG. 9 is a front view showing the frame assembly of FIG. 8 in an extended state.
Figure 10:
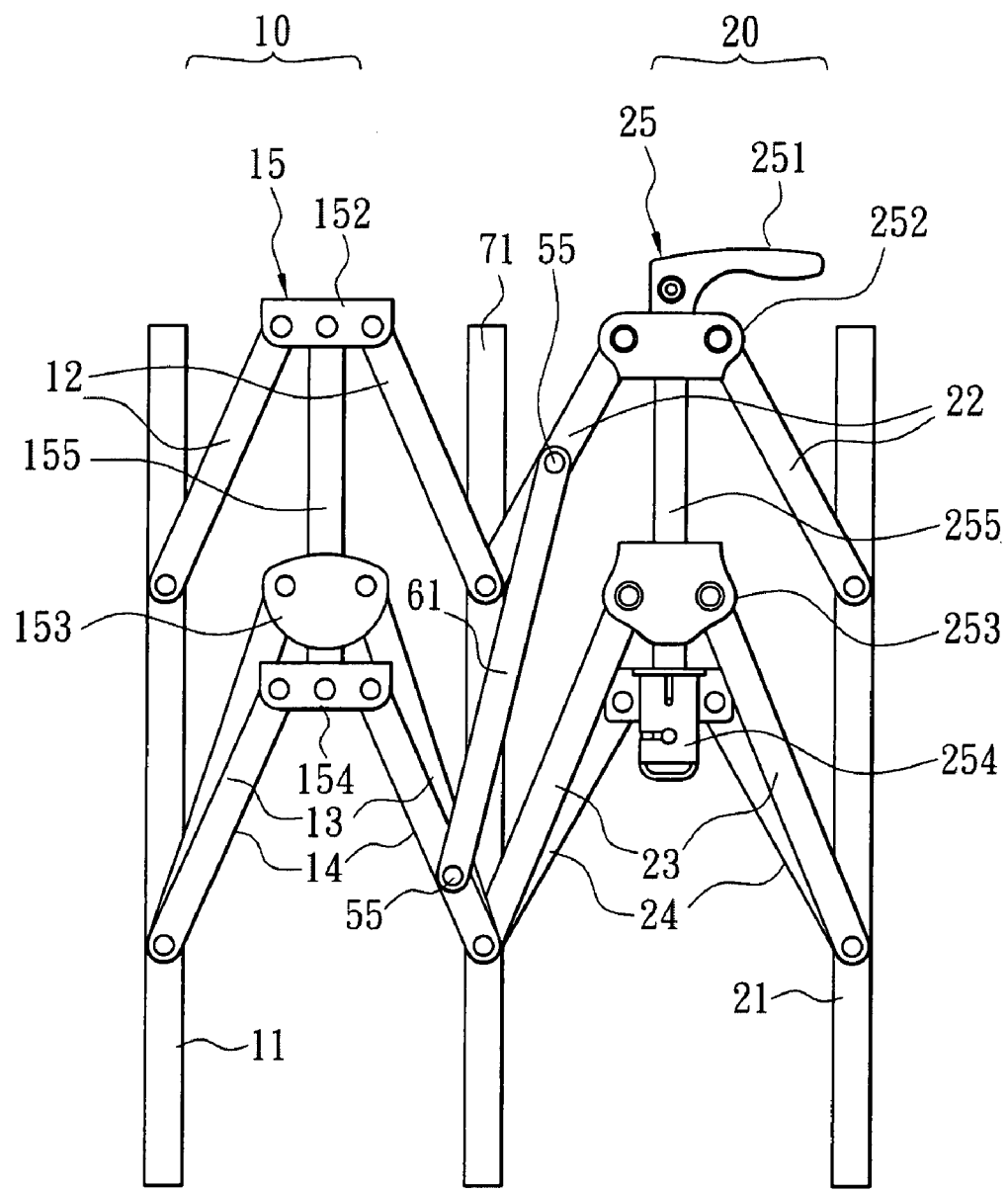
FIG. 10 is a front view showing the frame assembly of FIG. 8 in a semi-folded state.
Figure 11:
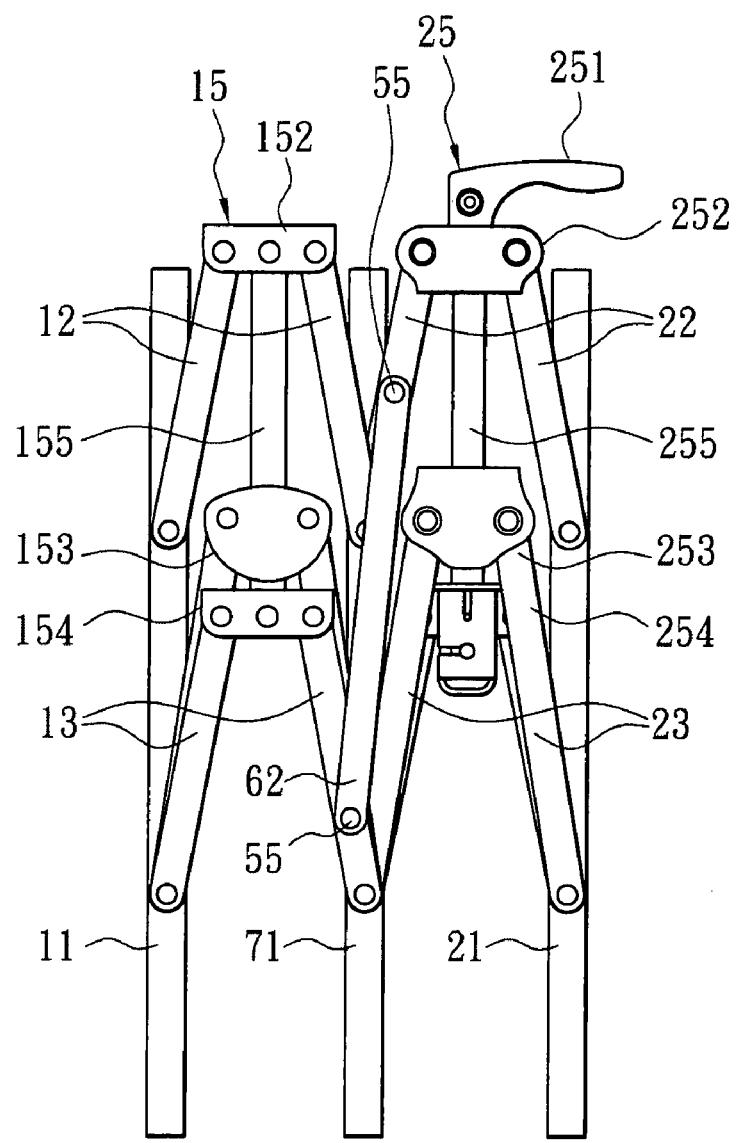
FIG. 11 is a front view showing the frame assembly of FIG. 8 in a folded state.

As shown in FIGS. 10 and 11, when the frame assembly is to be folded (at this time, FIG. 9 shows the frame assembly in an extended state), a folding operation identical to that of the first embodiment is implemented so that the bars 22, 23 and 24 are pivotally folded. In the meantime, the linking bar 62 is driven to pull the right third bar 14 upward with the pivotal folding of the bars 22, 23 and 24 of the second frame 20 by the linking bar 62 connected between the first frame 10 and the second frame 20, so that the first frame 10 is driven to pivotally fold and the first main post 11, the central post 71 and the second main post 21 become close to one another to complete the folding operation of the frame assembly.

Extending Operation of the Frame Assembly

When the frame assembly is to be extended (at this time, FIG. 11 shows the frame assembly in a folded state), the user can hold the central post 71 with his hand and steps on the pedal 254. In the meantime, the slide 253 slides upward with respect to guide bar 255 and the first frame 10 and the second frame 20 are extended, so that the first main post 11, the central post 71 and the second main post 21 become away from one another to complete the extending operation of the frame assembly.

Third Preferred Embodiment

Structure of the Frame Assembly

Figure 12:
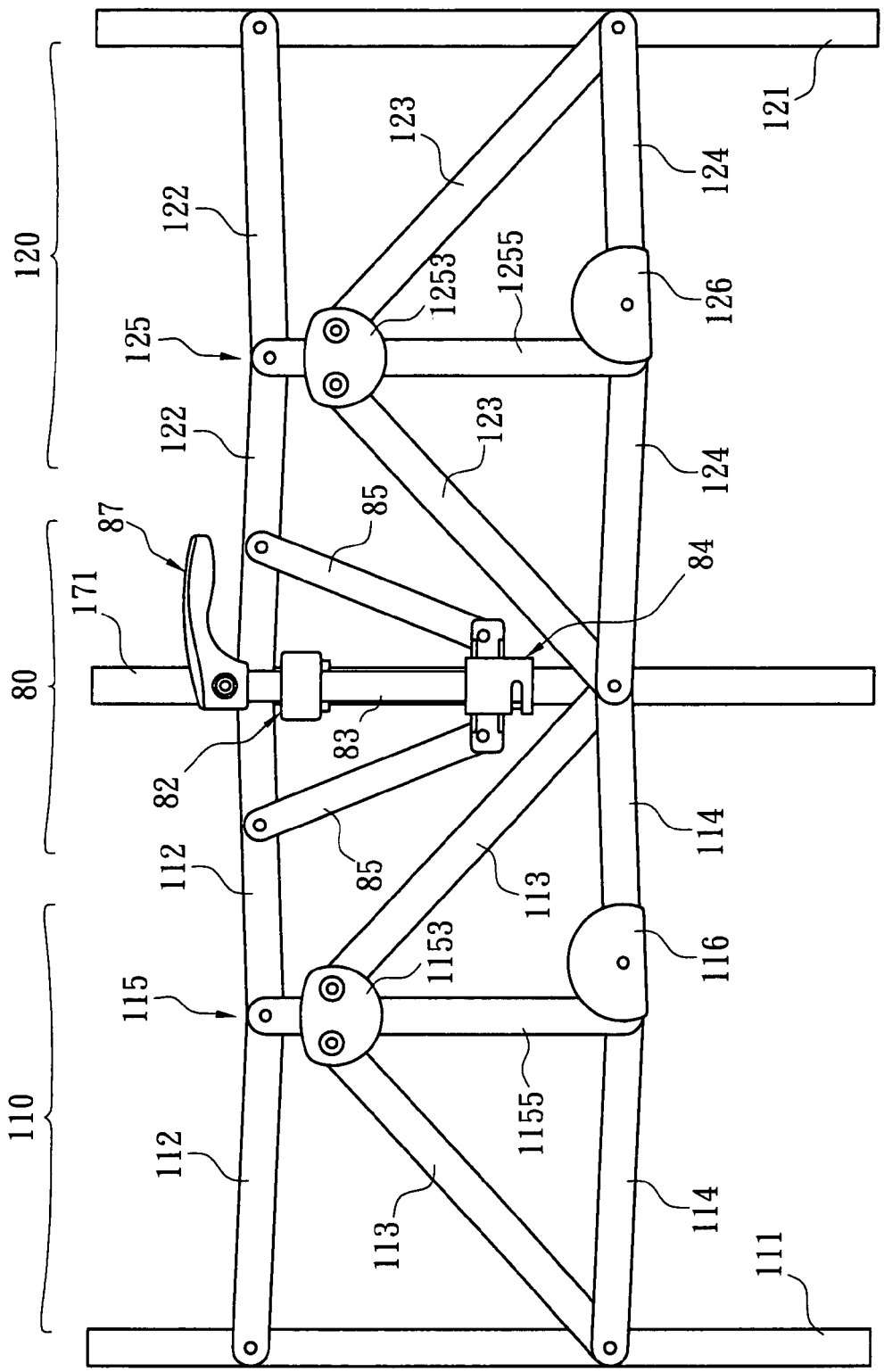
FIG. 12 is a front view of a frame assembly for a double-seat baby stroller according to a third preferred embodiment of the present invention.

As shown in FIG. 12, a frame assembly of a double-seat baby stroller according to a third embodiment of the present invention comprises a first frame 110, a second frame 120 and a linking mechanism 80.

As shown in FIG. 12, the first frame 110 includes a first main post 111, two first bars 112, two second bars 113, two third bars 114, a central post 171 and a first folding device 115.

The first folding device 115 includes a slide 1153 and a guide bar 1155. The guide bar 1155 is passed through a perforation (not shown) of the slide 1153 so that the slide 1153 can slide on the guide bar 1155.

Figure 14:
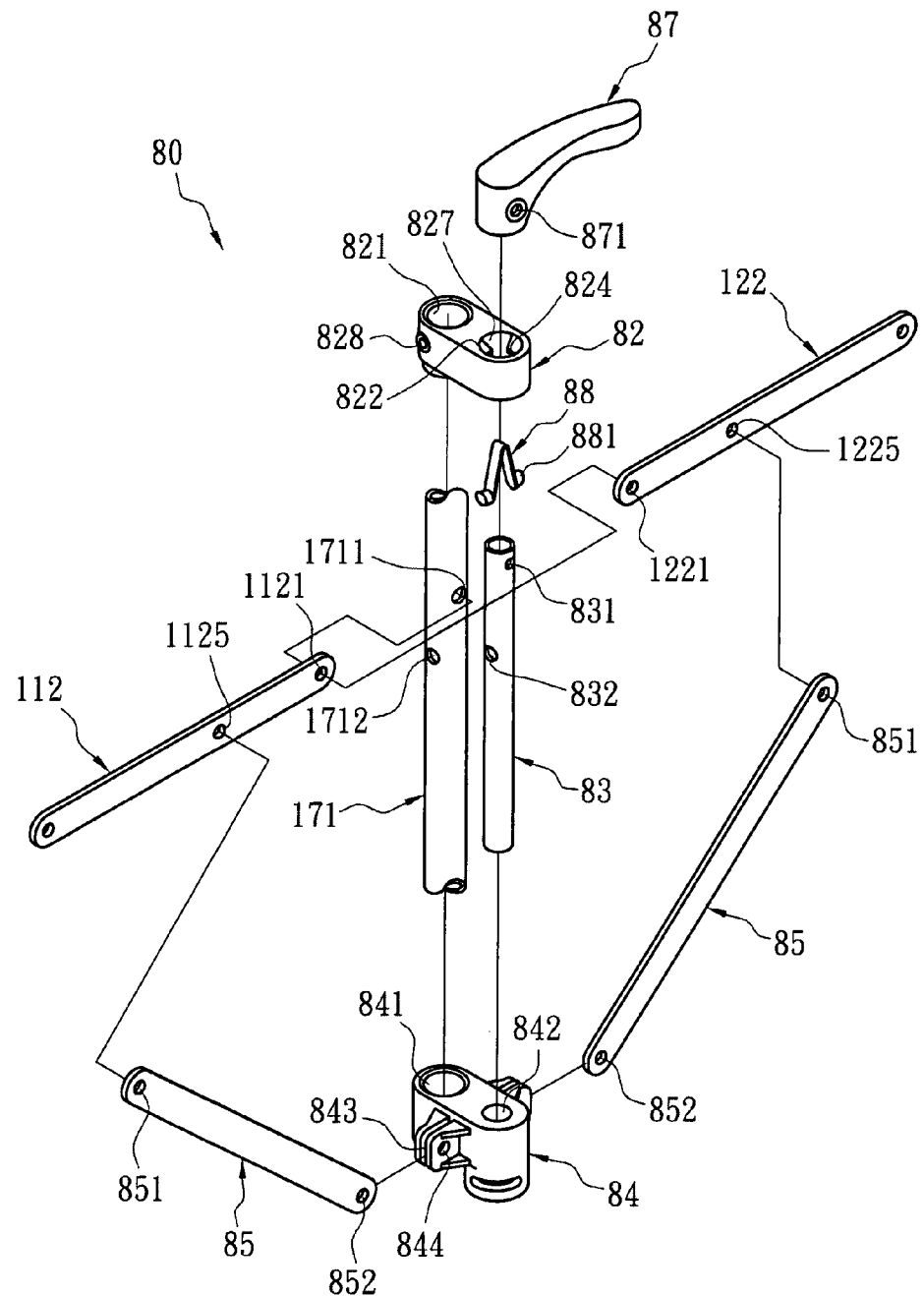
FIG. 14 is an exploded view of the linking mechanism of FIG. 13.

As shown in FIG. 12, the respective ends of the two first bars 112 close to each other are pivotally connected to the upper end of the guide bar 1155. The left end of the first bar 112 on the left is pivotally connected to the first main post 111, and the first bar 112 on the right is provided with a first pivot hole 1121 at the right end thereof and a second pivot hole 1125 near the center thereof, as shown in FIG. 14. The respective ends of the two second bars 113 close to each other are pivotally connected to the left and right sides of the slide 1153 respectively. The respective ends of the two third bars 114 close to each other are pivotally connected together to the lower end of the guide bar 1155. The left end of the left second bar 113 and the left end of the left third bar 114 are pivotally connected together to the first main post 111.

As shown in FIG. 14, the central post 171 is in the form of a hollow tube, and has a pair of fist connecting holes 1711 opposed to each other in the transversal direction and a pair of second connecting holes 1712 located below the first connecting holes 1711.

As shown in FIG. 12, the second frame 120 includes a second main post 121, two fourth bars 122, two fifth bars 123, two sixth bars 124, the central post 171 and a folding device 125.

The second folding device 125 includes a slide 1253 and a guide bar 1255. The guide bar 1255 is passed through a perforation (not shown) of the slide 1253 so that the slide 1253 can slide on the guide bar 1255.

The structure and assembly of the second frame 120 is identical to those of the first frame 110, and thus the description thereof is omitted.

Structure of the Linking Mechanism

Figure 13:
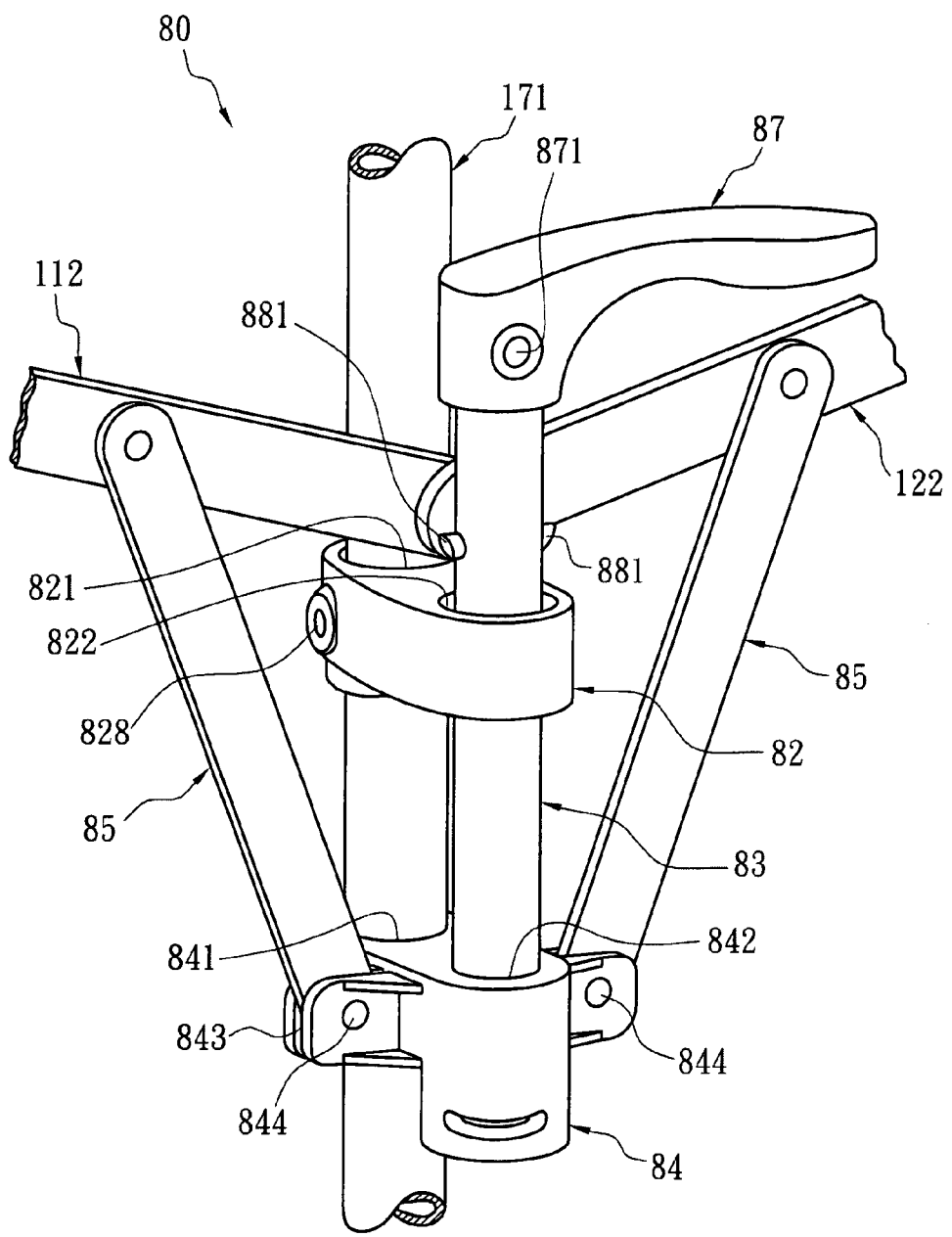
FIG. 13 is a perspective view of a linking mechanism of the frame assembly of FIG. 12.

As shown in FIGS. 12 to 14, the linking mechanism 80 includes a retaining bracket 82, an actuating post 83, a linking base 84, a pair of linking bars 85, a handle 87 and an elastic member 88 (see FIG. 14).

Figure 15:
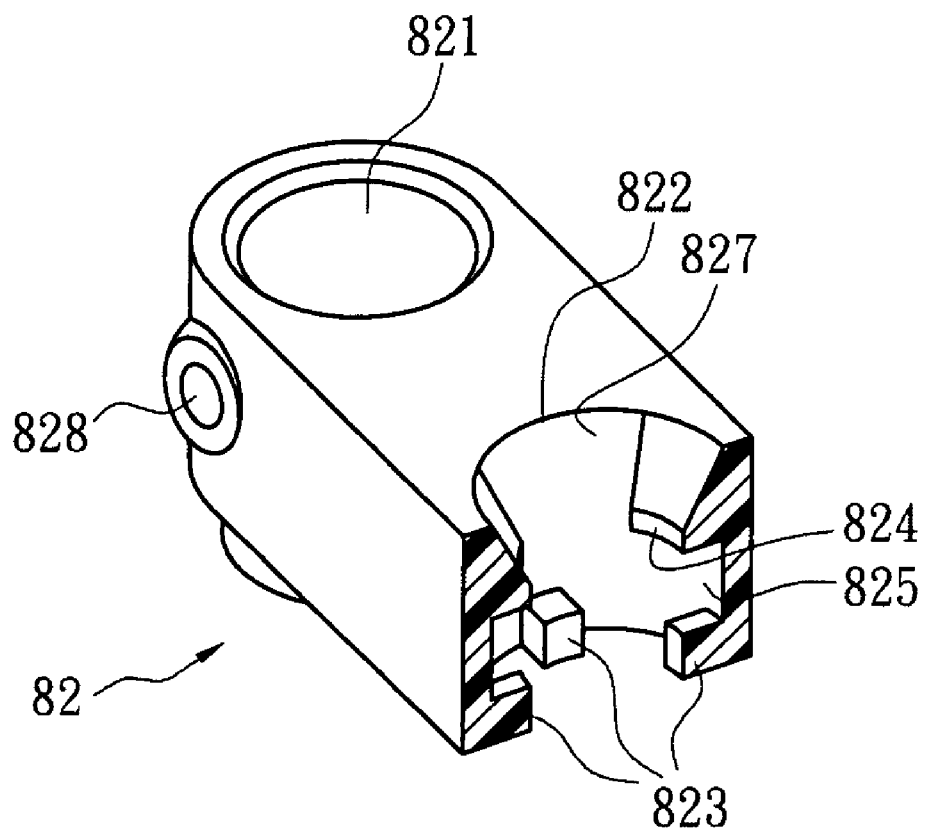
FIG. 15 is a cutaway view of a retaining bracket of the linking mechanism of FIG. 13.

As shown in FIGS. 14 and 15, the retaining bracket 82 is provided with a first through hole 821, a second through hole 822, four ribs 823 protruding from a lower portion of the inner wall of the second through hole 822, two shoulders 824 opposed to each other in left and right portions on the inner wall of the second through hole 822, two recesses 825 defined between the ribs 823 and the shoulders 824, two gaps 827 defined between the shoulders 824 and a fixing hole 828 transversally penetrating the wall of the first through hole 821.

As shown in FIG. 14, the actuating post 83 is in the form of a hollow tube, and provided with a fixing hole 831 at the upper end and a pair of holes 832 opposed to each other in left and right portions in a middle portion.

The linking base 84 is provided with a third through hole 841, a fourth through hole 842 on the front-rear direction, and a pair of receiving grooves 843 and a pair of pivot holes 844 disposed respectively in the pair of receiving grooves 843 (only one shown in FIG. 14) on the left-right direction.

Each of the linking bars 85 has an upper pivot hole 851 at the upper end and a lower pivot hole 852 at the lower end.

The handle 87 has a central hole (not shown) at the bottom and a fixing hole 871 formed on the wall of the handle 87 and communicating with the central hole.

The elastic member 88 is in a shape of inverted "V," and provided with a protrusion 881 at each of two free ends thereof.

Assembly of the Linking Mechanism

The connection of the linking mechanism 80 with the first frame 110 and the second 120 will be described below with reference to FIGS. 13 to 16.

A connecting pin (not shown), such as a rivet, is passed through the first pivot hole 1121 of the right first bar 112 of the first frame 110, a third pivot hole 1221 of the left fourth bar 122 of the second frame 120 and the pair of pivot holes 1711 of the central post 171, so that the right first bar 112 and the left fourth bar 122 are pivotally connected to the central post 171. Subsequently, the lower end of the central post 171 is passed through the first through hole 821 of the retaining bracket 82 and the third through hole 841 of the linking base 84, and a connecting pin (not shown), such as a rivet, is passed through the fixing hole 828 of the retaining bracket 82 and the fixing holes 1712 of the central post 171, so that the retaining bracket 82 is fixed to the central post 171 and the linking base 84 is movable on the central post 171.

Next, the elastic member 88 is received within the actuating post 83, and the two protrusions 881 of the elastic member 88 are protruded from the two holes 832 of the actuating post 83 respectively by the resilient force of the elastic member 88. Then, the upper end of the actuating post 83 is inserted into the central hole (not shown) of the handle 87, and a connecting pin (not shown), such as a rivet, is passed through the fixing hole 871 of the handle 87 and the fixing hole 831 of the actuating post 83 to fasten the handle 87 and the actuating post 83 together. Subsequently, as shown in FIG. 12, the right ends of the right second and third bars 113 and 114 and the left ends of the fifth and sixth bars 123 and 124 are pivotally connected together to a lower portion of the central post 171.

Further, the lower end of the actuating post 83 is passed through the second through hole 822 of the retaining bracket 82 from top to bottom. When the protrusions 881 of the elastic member 88 mounted within the actuating post 83 are just moved to the second through hole 822 of the retaining bracket 82, the protrusions 881 of the elastic member 88 are pressed into the inside of the actuating post 83 by the two shoulders 824 in the second through hole 822, and then the protrusions 881 are protruded out of the actuating post 83 again due to the resilient force of the elastic member 88 and received in the recesses 825 of the retaining bracket 82. Subsequently, the lower end of the actuating post 83 is rotatably connected to the fourth through hole 842 of the linking base 84.

Figure 17A:
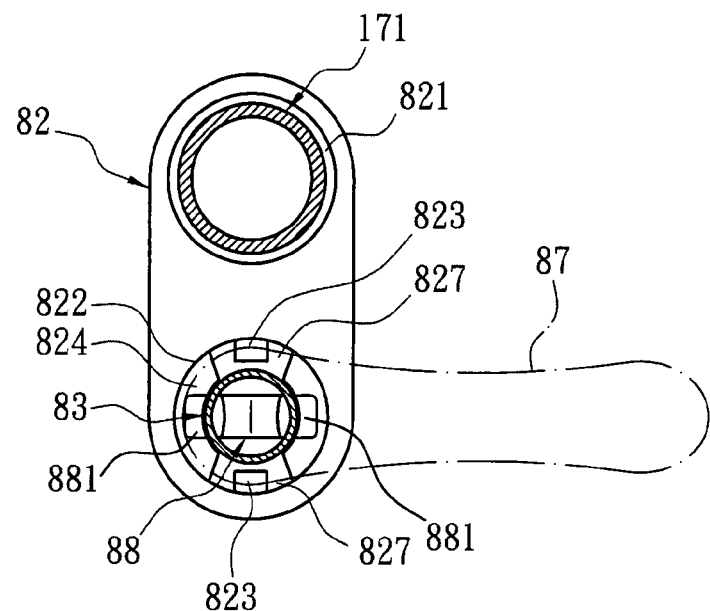
FIGS. 17A and 17B are sectional views showing the linking mechanism of FIG. 13 in different operations respectively, viewed from the top.

As shown in FIG. 17A, since the protrusions 881 are restrained by the shoulders 824, the actuating post 83 cannot move with respect to the retaining bracket 82. When the handle 87 is rotated and the protrusions 881 are removed from the recesses 825 and moved to the gaps 827, the actuating post 83 can move with respect to the retaining bracket 82.

Finally, as shown in FIG. 14, connecting pins (not shown), such as rivets, are passed respectively through the upper pivot hole 851 of one of the linking bars 85 and the pivot hole 1125 of the right first bar 112, and through the upper pivot hole 851 of the other one of the linking bar 85 and the pivot hole 1225 of the left fourth bar 122, so that the upper ends of the pair of linking bars 85 are pivotally connected to the right first bar 112 and the left fourth bar 122. Subsequently, the lower pivot holes 852 of the pair of linking bar 85 are inserted respectively into the pair of receiving grooves 843 provided in the left and right portions of the linking base 84, and connecting pins (not shown), such as rivets, are passed respectively through the pivot holes 844 of the linking base 84 and the respective lower pivot holes 852 of the linking bars 85, so that the pair of linking bars 85 are pivotally connected to the linking base 84.

By way of the above connection, the frame assembly for a double-seat baby stroller according to the third preferred embodiment of the present invention is completed.

Folding Operation of the Frame Assembly

Figure 17B:
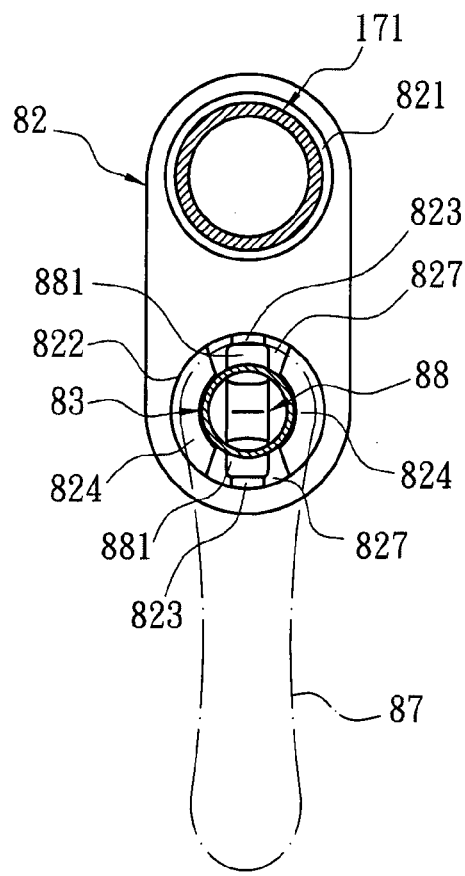
Figure 18:
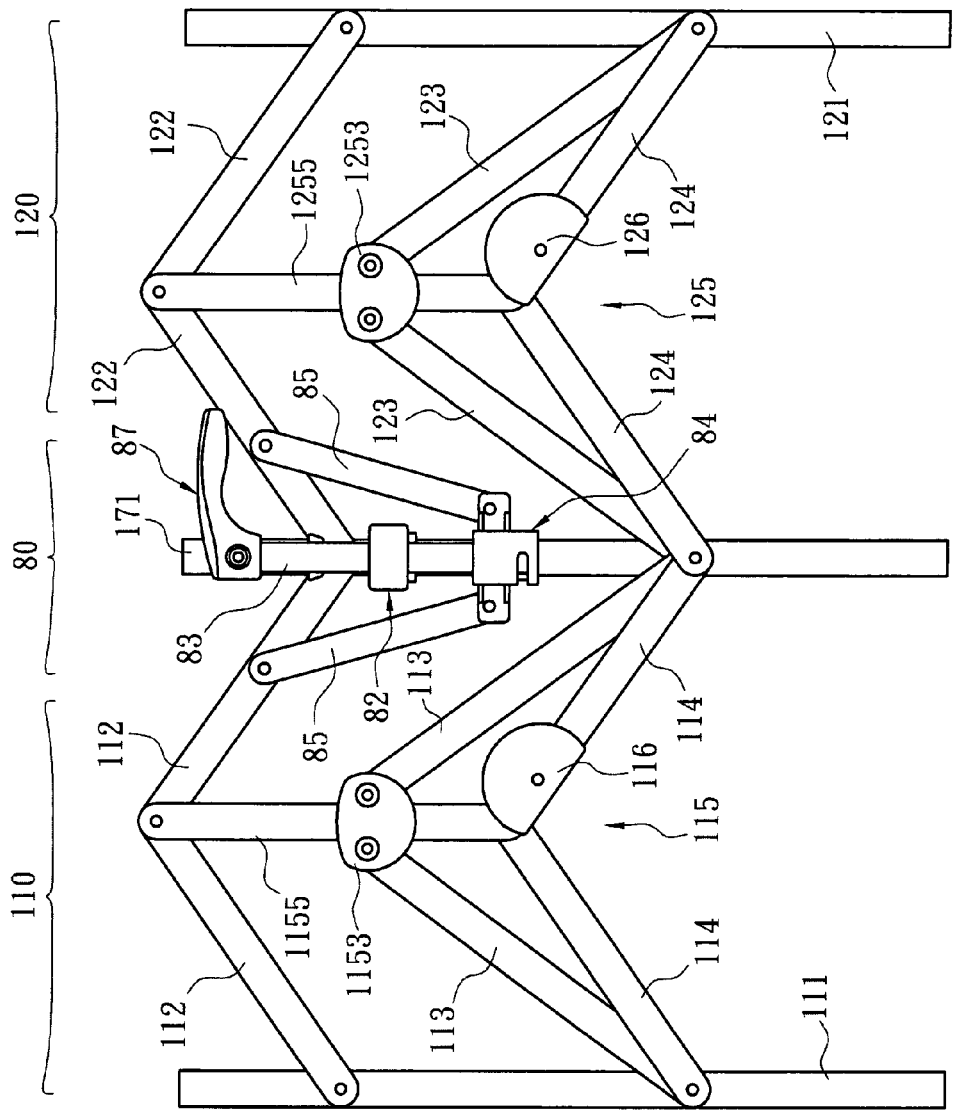
FIGS. 18 and 19 are front views showing the frame assembly of FIG. 8 in semi-folded and folded states respectively.
Figure 19:
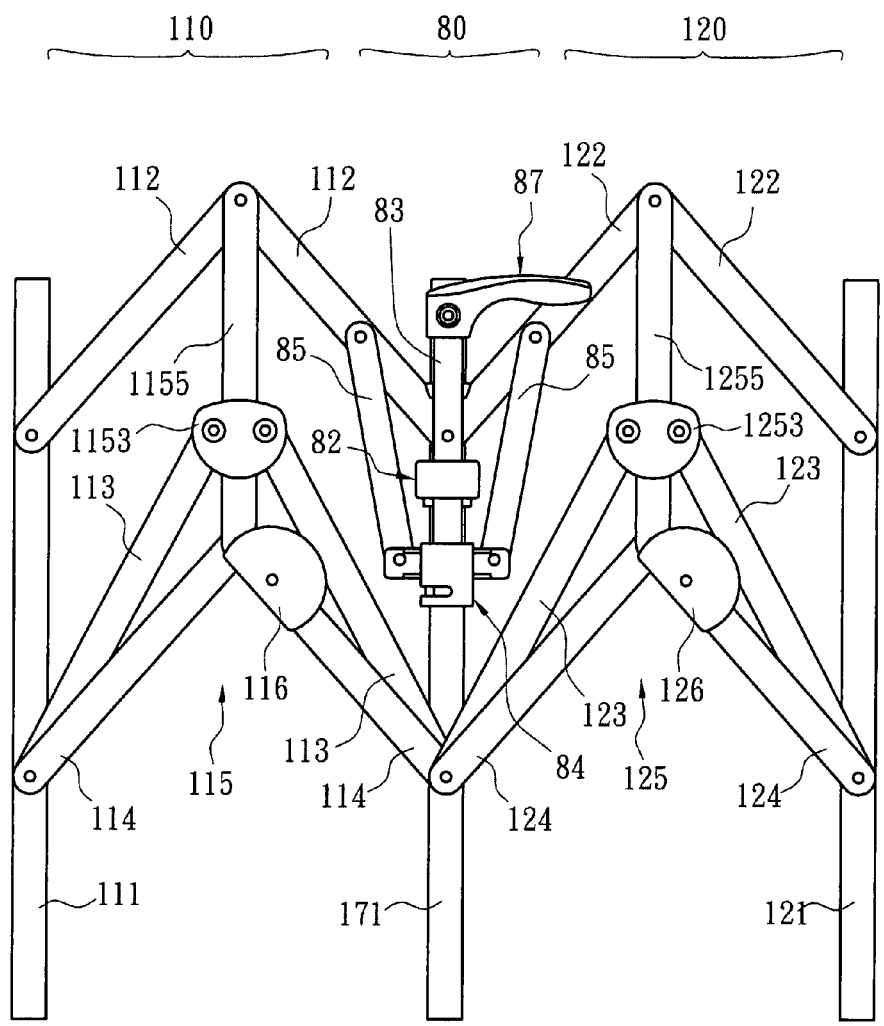

When the frame assembly is to be folded (at this time, FIG. 12 shows the frame assembly in an extended state), the handle 87 is turned to move the protrusions 881 of the elastic member 88 to align with the gaps 827 of the retaining bracket 82 (as shown in FIG. 17B) and then pulled upward, so that the linking base 84 moves upward along with the handle 87 and the actuating post 83, and in the meantime, the upper ends of the pair of linking bars 85 move upward. As shown in FIGS. 18 and 19, with the upward movement of the upper ends of the pair of linking bars 85, the left end of the right first bar 112 and the right end of the left fourth bar 122 turn pivotally with respect to the central post 171. In the meantime, the guide bar 1155 of the first folding device 115 and the guide bar 1255 of the second folding device 125 move upward with respect to the central post 171, the slide 1153 of the first folding device 115 and the slide 1253 of the second folding device 125 move downward along the guide bars 1155 and 1255 respectively, and the first main post 111 and the second main post 121 move downward with respect to the guide bars 1155 and 1255 respectively. Thus, when the first frame 110 and the second frame 120 are linked to fold, the main post 111, the central post 171 and the second main post 121 become close to one another. When the pair of linking bars 85 become substantially parallel to each other and the main post 111, the central post 171 and the second main post 121 become close to one another, the frame assembly is in the folded state.

Extending Operation of the Frame Assembly

Figure 16:
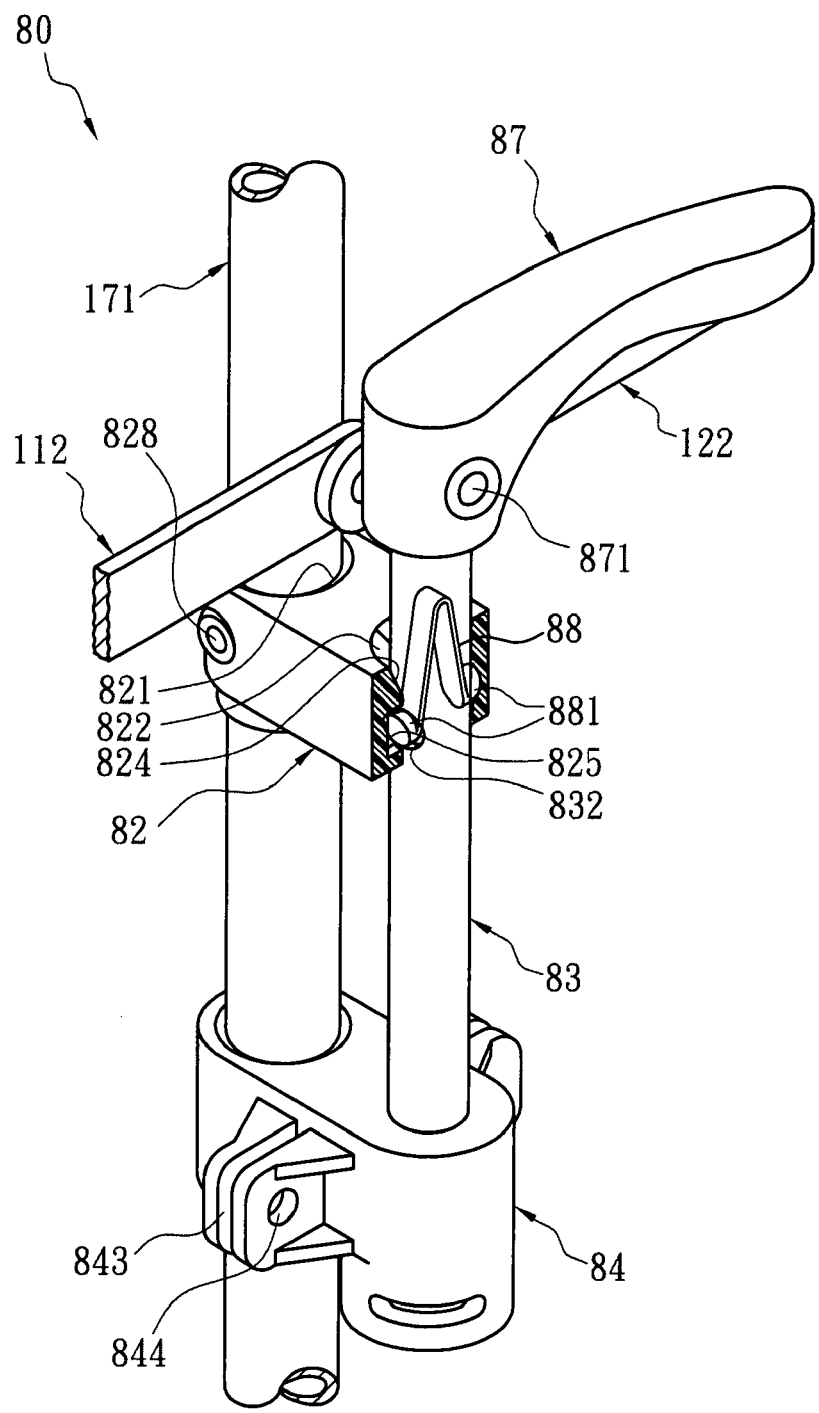
FIG. 16 is a partial cutaway view of the linking mechanism of FIG. 13.

When the frame assembly is to be extended (at this time, FIG. 19 shows the frame assembly in a folded state), the user can hold the central post 171 with one hand and push the handle 87 downward with the other hand to move the actuating post 83 downward along the retaining bracket 82. In the meantime, the protrusions 881 of the elastic member 88 are pressed into the inside of the actuating post 83 by a beveled surface on the shoulders 824 of the retaining bracket 82 and then keep moving downward, until the protrusions 881 after passing through the shoulders 824 are protruded out of the actuating post 83 again by the resilient force of the elastic member 88 and received in position within the recesses 825 of the retaining bracket 82 (as shown in FIG. 16). In the meantime, the actuating post 83 of the linking mechanism 80 moves downward with respect to the central post 171, the first frame 110 and the second frame 120 are extended, and the first main post 111, the central post 171 and the second main post 121 become away from one another, thereby the frame assembly remaining in the extended state as shown in FIG. 12.

In the present embodiment, the retaining bracket 82, actuating post 83, handle 87 and elastic member 88 of the linking mechanism 80 form a folding unit. The folding unit can move between a locked position and an unlocked position by rotation of the handle 87. When the folding unit is in the locked position, the linking base 84 cannot move arbitrarily with respect to the central post 171, and the frame assembly thus remains in the extended state. When the folding unit is in the unlocked position, the linking base 84 can move with respect to the central post 171 to drive the movement of the linking bars 85. In alternative embodiments, the folding unit can be replaced by a conventional locking unit that is implemented with the function for locking the linking base 84 in position. In another embodiment, the linking bars 85 are alternatively connected to the third bar 114 and the sixth bar 124 as long as they drive the linking base 84 to move upward after the folding unit is unlocked and furthermore, drive the bars of the two frames to move toward folding positions, thereby achieving the object of the present invention.

Given the disclosure of the present invention, one skilled in the art would appreciate that there may be other embodiments and modifications within the scope of spirit of the present invention. Accordingly, all modifications attained by one skilled in the art from the present disclosure within the scope and spirits of the present invention are to be included as further embodiments of the present invention. The scope of the present invention accordingly is to be defined as set forth in the appended claims.

What is claimed is:

1. A frame assembly for a double-seat baby stroller, comprising:
    a first frame including a first main post, plural first bars, plural second bars, plural third bars, a central post and a first folding device pivotally connected to one another; and
    a second frame including a second main post, plural fourth bars, plural fifth bars, plural sixth bars, the central post and a second folding device pivotally connected to one another;
    wherein the frame assembly further comprises a linking mechanism connecting one of the bars of the first frame and one of the bars of the second frame, and when the second main post of the second frame and the central post become close to each other, the one of the bars of the first frame is driven to move via the linking mechanism by the one of the bars of the second frame, so that the first main post of the first frame and the central post become close to each other.

2. A frame assembly for a double-seat baby stroller according to claim 1, wherein the linking mechanism further comprises a linking member vertically movably connected to the central post, one end of the one of the bars of the first frame and one end of the one of the bars of the second frame being pivotally connected to the linking member respectively.

3. A frame assembly for a double-seat baby stroller according to claim 2, wherein the linking member has a pair of vertical slide ways arranged in a column and a pair of horizontal slide ways at two sides of the pair of vertical slide ways, and the one of the bars of the first frame and the one of the bars of the second frame are pivotally connected at the lower vertical slide way and slidably connected at the pair of horizontal slide ways respectively.

4. A frame assembly for a double-seat baby stroller according to claim 3, wherein the linking mechanism further comprises a guide member fixed to the central post, the guide member having a pair of slide ways opposed to each other at two sides to be connected with the one of the bars of the first frame and the one of the bars of the second frame respectively.

5. A frame assembly for a double-seat baby stroller according to claim 4, wherein the pair of slide ways of the guide member are in the form of an arc.

6. A frame assembly for a double-seat baby stroller according to claim 4, wherein the guide member includes a front housing portion and a rear housing portion, each of the front and rear portions having the pair of slide ways opposed to each other in the left and right portions, one end of the one of the bars of the first frame being located between the linking member and the rear housing portion, one end of the one of the bars of the second frame being located between the rear housing portion and the central post.

7. A frame assembly for a double-seat baby stroller according to claim 1, wherein the linking mechanism includes a linking bar, one end of the linking bar being connected to the one of the bars of the first frame and the other end of the linking bar being connected to the one of the bars of the second frame.

8. A frame assembly for a double-seat baby stroller according to claim 7, wherein the one end of the linking bar is connected to one of the third bars of the first frame, and the other end of the linking bar is connected to one of the fourth bars of the second frame.

9. A frame assembly for a double-seat baby stroller, comprising:
    a first main post;
    a second main post;
    a central post provided between the first and second main posts;
    a first frame including plural bars provided between the first post and the central post, the plural bars being pivotally connected to the first post and the central post;
    a second frame including plural bars provided between the second main post and the central post, the plural bars being pivotally connected to the second main post and the central post; and
    a linking mechanism connecting one of the bars of the first frame and one of the bars of the second frame so as to drive the first post, the central post and the second main post to become close to one another simultaneously so that the frame assembly is in a folded state, and to become away from one another simultaneously so that the frame assembly is in an extended state.

10. A frame assembly for a double-seat baby stroller according to claim 9, wherein the frame assembly comprises a folding device provided between the first main post and the central post and movable between a locked position and an unlocked position, wherein when the folding device is in the locked position, the frame assembly remains in the extended state, and when the folding device is in the unlocked position, the first main post and the central post are able to become close to each other, and the second main post and the central post are simultaneously driven to become close to each other by the linking mechanism so that the frame assembly is in the folded state.

11. A frame assembly for a double-seat baby stroller according to claim 9, wherein the linking mechanism comprises a linking member vertically movably connected to the central post, the one of the bars of the first frame and the one of the bars of the second frame being pivotally connected to the linking member respectively.

12. A frame assembly for a double-seat baby stroller according to claim 11, wherein the linking member has a pair of vertical slide ways arranged in a column and a pair of horizontal slide ways at two sides of the pair of vertical slide ways, and the one of the bars of the first frame and the one of the bars of the second frame are pivotally connected at the lower vertical slide way and slidably connected at the pair of horizontal slide ways respectively.

13. A frame assembly for a double-seat baby stroller according to claim 9, wherein the linking mechanism comprises a linking bar, one end of the linking bar being connected to one of the bars of the first frame and the other end of the linking bar being connected to one of the bars of the second frame.

14. A frame assembly for a double-seat baby stroller according to claim 9, wherein the linking mechanism further comprises a link base slidably mounted on the central post and a pair of linking bars, one end of the linking bars being pivotably connected to two sides of the linking base, the other end of the linking bars being pivotally connected respectively to the one of the bars of the first frame and the one of the bars of the second frame.

15. A frame assembly for a double-seat baby stroller, comprising:
a first frame including a first main post, plural first bars, plural second bars, plural third bars, a central post and a first folding device pivotally connected to one another;
a second frame including a second main post, plural fourth bars, plural fifth bars, plural sixth bars, the central post and a second folding device pivotally connected to one another; and
a linking mechanism slidably mounted on the central post; wherein one of the bars of the first frame and one of the bars of the second frame are pivotally connected to two sides of the linking mechanism respectively, and the linking mechanism is able to drive upward and downward along the central post so as to drive the first post, the central post and the second main post to become close to or away from one another simultaneously.

16. A frame assembly for a double-seat baby stroller according to claim 15, wherein the linking mechanism further comprises a linking base slidably mounted on the central post and a pair of linking bars, one end of the linking bars being pivotally connected to two sides of the linking base respectively, the other end of the linking bars being pivotally connected to the one of the bars of the first frame and the one of the bars of the second frame respectively.

17. A frame assembly for a double-seat baby stroller according to claim 16, wherein the linking mechanism includes a folding unit connecting the linking base and movable between a locked position and an unlocked position, wherein when the folding unit is in the locked position, the linking base is fixed to the central post, and when the folding unit is in the unlocked position, the folding unit is able to drive the linking base to move with respect to the central post.

18. A frame assembly for a double-seat baby stroller according to claim 17, wherein the folding unit includes a retaining bracket fixed to the central post and an actuating post fixed to the linking base and moved slidably relative to the retaining bracket, the actuating post being movable between a locked position where the actuating post is locked with the retaining bracket and the first post, and the central post and the second main post are moved to become away from each other; and an unlocked position where the actuating post is able to slide relative to the retaining bracket and the first post, and the central post and the second main post are moved to become close to each other simultaneously.

19. A frame assembly for a double-seat baby stroller according to claim 18, wherein the linking mechanism further includes an elastic member received within the actuating post and having plural protrusions protruding out of the actuating post, and the retaining bracket includes a through hole provided with plural recesses, so that the actuating post are rotatable between a locked position where the protrusions of the elastic member are received in the recesses of the through hole and an unlocked position where the protrusions of the elastic member are removed from the recesses.

20. A frame assembly for a double-seat baby stroller according to claim 15, wherein the linking mechanism comprises a linking member vertically movably connected to the central post and having a pair of horizontal slide ways at two sides, so that one end of the one of the bars of the first frame and one end of the one of the bars of the second frame are slidably connected to the pair of horizontal slide ways respectively.

* * * * *